United States Patent [19]

Babb et al.

[11] 4,255,167
[45] Mar. 10, 1981

[54] PROCESS FOR PURIFYING CYANOGEN CHLORIDE GAS

[75] Inventors: Robert M. Babb; Melvin J. Guillory, Jr., both of Baton Rouge, La.

[73] Assignee: Ciba-Geigy Corporation, Ardsley, N.Y.

[21] Appl. No.: 961,794

[22] Filed: Nov. 17, 1978

[51] Int. Cl.³ .............................................. B01D 53/14
[52] U.S. Cl. .......................................... 55/71; 203/42; 423/383
[58] Field of Search ............... 55/71; 203/42; 423/383

[56] References Cited

U.S. PATENT DOCUMENTS

| 3,535,090 | 10/1970 | Durrell et al. | 55/71 |
| 3,568,408 | 3/1971 | Riethmann et al. | 55/71 |
| 3,593,494 | 7/1971 | Durrell et al. | 55/71 X |
| 3,607,671 | 9/1971 | Riethmann et al. | 203/42 X |
| 3,618,295 | 11/1971 | Geiger et al. | 55/71 |
| 3,741,729 | 6/1973 | Evers et al. | 203/42 X |
| 3,864,104 | 2/1975 | Durrell et al. | 55/71 |

FOREIGN PATENT DOCUMENTS 895204  3/1972  Canada ......................................... 55/71

Primary Examiner—Robert H. Spitzer
Attorney, Agent, or Firm—Karl F. Jorda

[57] ABSTRACT

A single-step process is disclosed for purifying raw cyanogen chloride gas contaminated with chlorine by fractionally separating chlorine from cyanogen chloride and thereafter absorbing essentially chlorine-free cyanogen chloride in a solvent.

5 Claims, No Drawings

PROCESS FOR PURIFYING CYANOGEN CHLORIDE GAS

BACKGROUND OF THE INVENTION

1. Field of the Invention

This invention relates to the purification of raw cyanogen chloride gas contaminated with chlorine. Chlorine-free cyanogen chloride is a required starting material in the synthesis of some pesticidal compounds, such as, for instance triazolyl organophosphorous derivatives (see U.S. Pat. No. 3,867,396).

2. Description of the Prior Art

U.S. Pat. No. 3,226,182 provides a process for purifying raw cyanogen chloride gas, contaminated with hydrogen cyanide and chlorine, by contacting the raw gas with a slurry containing a soluble ferrous salt and an insoluble carbonate and then recovering the preferred cyanogen chloride gas therefrom. It will be noted that such purification procedure necessitates two chemical process unit operations, viz. fractionally separating chlorine from cyanogen chloride employing a soluble ferrous salt and an insoluble carbonate and thereafter absorbing the purified cyanogen chloride in a solvent.

SUMMARY OF THE INVENTION

It has now been found that the use of an insoluble carbonate, concomitantly employed with a solution of a ferrous salt can be dispensed with if a single liquid-vapor contacting column to fractionally separate chlorine from cyanogen chloride and to absorb the purified cyanogen chloride containing less than 0.05% by weight of chlorine in a solvent, is employed.

In its more specific aspects the operation comprises a continuous process which is carried out at atmospheric pressure. However, higher pressures up to, e.g., 50 p.s.i.g. or more can be used. A vapor mixture of cyanogen chloride and chlorine is fed to a fractionation column with or without a rectification section. Use of a rectification section is suitable when it is desired to obtain an overhead product stream containing less than about 30% cyanogen chloride in chlorine.

A solvent, such as, preferably ethylene dichloride is fed to the bottom of the column below the plates or packing. Other solvents which can be employed are those with higher boiling points than that of cyanogen chloride, i.e., such hydrocarbons as kerosene, hexane, heptane, benzene, toluene, xylene; such halogenated hydrocarbons as bromobenzene, o-bromotoluene, n-butyl bromide, n-butyl chloride, t-butyl chloride, chlorobenzene, o-dichloro benzene, 1,4-dichlorobutane, 1,1-dichloroethane, 1,2-dichloro ethylene, 1,2-dichloropropane, ethylene, dibromide, methylene chloride, tetrachloro ethane, carbon tetrachloride, chloroform, tetrachloroethylene, 1,1,1-trichloro ethane; such nitro compounds as nitro benzene, nitro methane; such nitriles as acetonitrile, acrylonitrile, adiponitrile, benzonitrile, butylnitrile; such ethers as chloromethyl ether, dimethoxy ethane, dimethoxy methane, ethyl ether, tetrahydrofuran, dioxane; and such esters as benzyl acetate, ethyl acetate, cellosolve acetate, iso-butyl acetate.

Due to the relatively large differences in volatilities among chlorine, cyanogen chloride and ethylene dichloride (i.e., pure component boiling points being $-34.6°$ C., $13°$ C. and $82.4°$ C., respectively) the chlorine-cyanogen chloride separation and cyanogen chloride absorption are accomplished in the following manner.

(1) A relatively small rectification section is used in the column to concentrate chlorine from 5% in the cyanogen chloride feed to about 80% in the vent gas. The vent gas is recycled to the cyanogen chloride process as a valuable raw material.

(2) The refluxed liquid from the condenser contains about 3.4% chlorine in cyanogen chloride at $10°$ C. Reduction of the chlorine composition to a maximum 1500 ppm on a cyanogen chloride basis as 150 ppm on a 10% cyanogen chloride in ethylene dichloride solution basis, is accomplished by addition of ethylene dichloride directly to the column reboiler and by countercurrent stripping with reboiler vapors in the contacting section of the column. The reboiling solvent provides vapors necessary for stripping the chlorine from the cyanogen chloride in the upper portion of the stripping section. This section may be either plates or packing and has shown to require less than 10 theoretical stages for above stated chlorine reduction.

(3) Cyanogen chloride absorption/dissolution is accomplished simultaneously in the lower part of the stripping section where the reboiling cyanogen chloride-ethylene dichloride vapor mixture contacts refluxing cyanogen chloride. A continuation of liquid dissolution and vapor absorption results in about a 10% to 15% solution of cyanogen chloride in ethylene dichloride controlled by the rate of ethylene dichloride addition to the column and is removed from the column bottom.

Thus, this process system produces a relatively pure solution of cyanogen chloride in ethylene dichloride with a minimum of equipment required.

A separate absorption step was employed prior to this invention to absorb the total cyanogen chloride-chlorine vapor mixture. This solution was then distilled in the second column to remove the chlorine while retaining the cyanogen chloride. According to the present invention chlorine is first removed from cyanogen chloride in the upper portion of the column before contacting ethylene dichloride in the lower portion of the same column. Thus, the operation can be carried out in a single, smaller column. This process operation is also applicable to other two-component vapor mixtures when the less volatile component is to be dissolved in a solvent having a higher boiling point than either of the vapor components.

DESCRIPTION OF SPECIFIC EMBODIMENTS

The following data and examples will serve to illustrate the novel process of the present invention and the marked improvement obtained in the purification of raw cyanogen chloride gas containing chlorine as contaminant. It will be understood that the invention is not intended to be limited to the particular process disclosed. Various modifications thereof can be employed and will be readily apparent to those skilled in the art.

The improved process of the present invention was successfully carried out in a single Oldershaw distillation column. A total of five runs, two with the rectifying section two without the rectifying section and one with the addition of 5.6% moisture in the cyanogen chloride stream, were made to separate $Cl_2$ from $CNCl$. The latter run was made because in normal plant production of $CNCl$ a few percent of moisture may be present. Gas chromatography of the reboiler composition showed an average of 0.0093% $Cl_2$ and 10.75% $CNCl$ with the rectifying section, 0.0104% $Cl_2$ and 12.755 CNCl without the rectifying section and 0.022% Cl₂ and 9.49% CNCl with the addition of moisture in the CNCl stream (without a rectifying section. Sample analyses of these five runs are set forth in the following Table:

TABLE

| Example | Sample Point | Sample Time (Min) | Composition, Wt. % Cl$_2$ | CNCl |
|---|---|---|---|---|
| With Rectifying Section | | | | |
| 1 | Reboiler Bottom | 135 | 0.0148 | 9.75 |
| | Feed | 135 | 6.17 | 93.83 |
| | Overhead | 135 | 48.0 | 52.0 |
| 2 | Reboiler Bottom | 58 | 0.0028 | 10.89 |
| | | 126 | 0.0102 | 11.62 |
| | Feed | 56 | 8.66 | 91.34 |
| | | 125 | 6.3 | 93.7 |
| | Overhead | 56 | 79.57 | 20.43 |
| | | 125 | 78.99 | 21.01 |
| Without Rectifying Section | | | | |
| 3 | Reboiler Bottom | 120 | 0.0108 | 13.08 |
| | Feed | 106 | 6.996 | 93.004 |
| | Overhead | 117 | 71.56 | 28.44 |
| 4 | Reboiler Bottom | 75 | 0.0100 | 12.43 |
| | Feed | 100 | 6.996 | 93.004 |
| | Overhead | 89 | 66.91 | 33.09 |
| With the Addition of Moisture and Without Rectifying Section | | | | |
| 5 | Reboiler Bottom | 212 | 0.0220 | 9.49 |
| | Feed | 213 | 6.995 | 93.005 |
| | Overhead | 214 | 66.91 | 33.09 |

What is claimed is:

1. A process for purifying raw cyanogen chloride gas contaminated with chlorine which comprises fractionally separating chlorine from cyanogen chloride and thereafter absorbing essentially chlorine-free cyanogen chloride in a solvent which is fed to the bottom of the fractionation column and which has a higher boiling point than cyanogen chloride; the cyanogen chloride absorption and dissolution in the solvent being accomplished simultaneously in the lower portion of a stripping section, with the reboiling solvent providing vapors necessary for stripping the chlorine from the cyanogen chloride in the upper portion of the stripping section.

2. A process as defined in claim 1 wherein said process is carried out at atmospheric pressure.

3. A process as defined in claim 1 wherein the solvent is ethylene dichloride.

4. A process as defined in claim 1 wherein fractionation serves to concentrate chlorine from 5% in the feed to about 80% in the resulting vent gas.

5. A process as defined in claim 1 wherein refluxed liquid from a condenser contains about 3.4% chlorine in cyanogen chloride at 10° C. and the chlorine composition is reduced to a maximum 1500 ppm on a cyanogen chloride basis or 150 ppm on a 10% cyanogen chloride in ethylene dichloride solution basis.

* * * * *